Sept. 28, 1943.     H. H. BLAU     2,330,193
METHOD OF MAKING STAINED GLASS ARTICLES
Filed Feb. 7, 1941
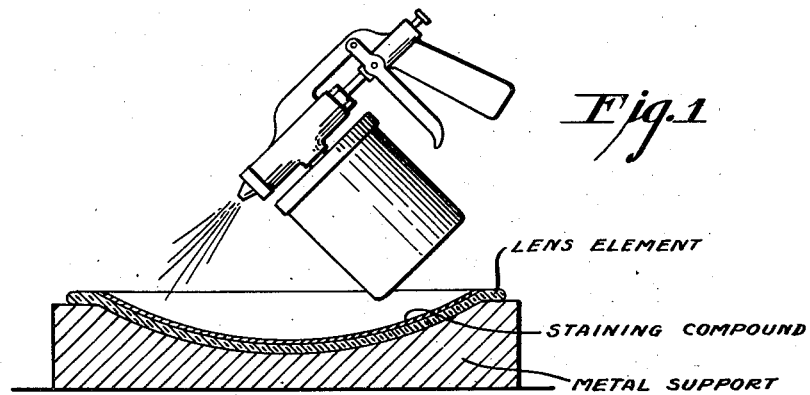
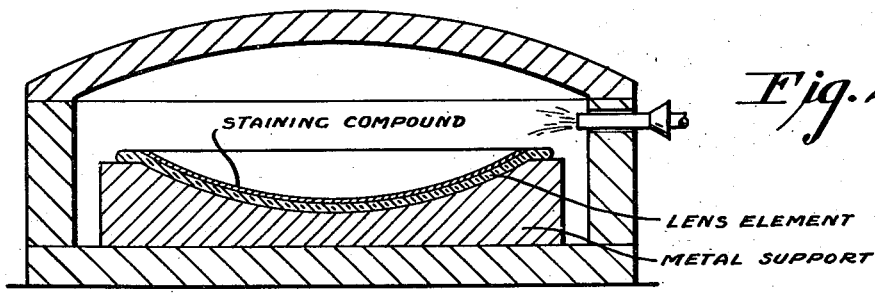
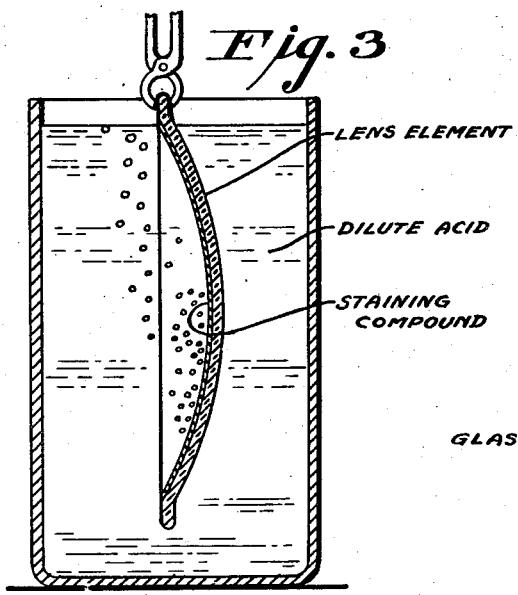
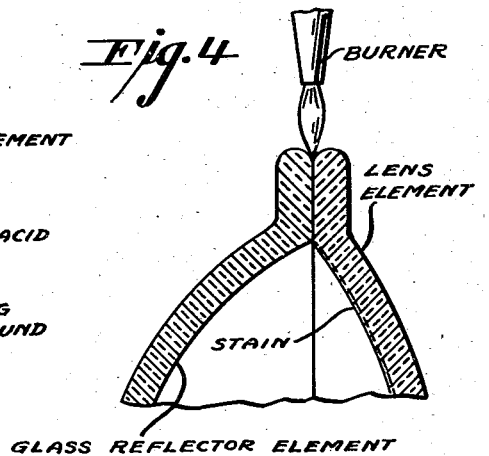
Inventor
HENRY H. BLAU
By
F. N. Knight
Attorney Patented Sept. 28, 1943

2,330,193

UNITED STATES PATENT OFFICE 2,330,193

METHOD OF MAKING STAINED GLASS ARTICLES

Henry H. Blau, Elmira, N. Y., assignor to Corning Glass Works, Corning N. Y., a corporation of New York Application February 7, 1941, Serial No. 377,917

2 Claims. (Cl. 49—79)

This invention relates to the manufacture of glass articles comprising a cover glass member thermally sealed by fusion with a glass reflector member, as for example, the vehicle head lamp described in Patent 2,148,314 and more particularly to a lamp in which the cover glass or lens member may be stained yellow with copper or silver or both for producing the so-called fog-penetrating light.

In the past it has been customary to stain the cover glass member by applying thereto a paste consisting preferably of ochre mixed with a small amount of copper and silver compounds and firing the coated member at a temperature slightly in excess of 500° C. after which the residuum of the staining paste was removed, not however without difficulty. During the subsequent step of sealing, the cover glass and especially that portion of the cover glass member adjacent the rim, where sealing occurred, became heated to a temperature greatly in excess of that employed in staining. This caused a substantial darkening of the color in the overheated portion as compared with the central portion of the member and resulted in non-uniformity of the color and opalescence in the finished article. The non-uniformity was accentuated by surface cords which did not accept the stain with the same facility as the rest of the glass. The use of a higher staining temperature resulted in increased difficulty in removing the residual staining paste from the glass.

The primary object of this invention is to seal a clear glass member to a stained glass member without changing the color of the latter.

Another object is to make a sealed glass headlamp having a stained cover glass member of uniform color.

Another object is to produce a uniform yellow or red stain in such cover glass members, or other glass parts for thermal sealing, the color of which will not become altered by sealing.

Another object is the easy and complete removal of the residual staining compound after the glass has been stained.

I have found that the above objects can be accomplished by employing a staining temperature substantially in excess of that attained in sealing the glass members and by using a staining compound which contains a stable carbonate which will not decompose nor attack the glass at the staining temperature.

In the above mentioned Patent 2,148,314, which was cited as an example of the production of a glass headlamp, the glass employed is preferably a heat resisting borosilicate and the temperature attained by the cover glass or lens element adjacent the seal is in the neighborhood of 600° C. I therefore employ a staining temperature of about 700° C. For other types of glass in which the sealing step would produce different temperatures I employ correspondingly different staining temperatures, it being essential to maintain the staining temperature well above the temperature attained by the glass in the neighborhood of the seal. For best results the difference should be about 100° C. or more.

In carrying out my process I preferably use a staining compound comprising a mixture of 54% ochre, 30% barium carbonate, 5% copper sulfide and 11% silver sulfide. In lieu of barium carbonate, other carbonates such as calcium carbonate may be used which will not decompose nor attack the glass at the staining temperature. The batch for the staining compound is thoroughly mixed and ground and then is made into a thin paste with water and applied preferably by spraying in a thin layer to the article to be stained. After drying, the coated article is fired at about 700° C. for about ten minutes. The fired article is cooled and immersed in dilute acid, whereupon the carbonate contained in the compound is acted upon by the acid and a vigorous evolution of carbon dioxide occurs which loosens the residue so that it can easily be removed. In the absence of the carbonate the residue would be extremely difficult to remove and would result in injury to the glass surface.

In order that my invention may be better understood reference is had to the drawing in which Fig. 1 is a view partly in section showing a lens element to which the staining compound is applied in a thin layer by means of a spray gun;

Fig. 2 is a sectional view showing a lens element having a layer of staining compound being fired in a kiln;

Fig. 3 is a sectional view of an acid bath and a stained and fired lens element dipped therein to remove the residual staining compound; and Fig. 4 is a fragmentary sectional view on an enlarged scale of portions of the lens element and a glass reflector element illustrating the method of sealing them together at their peripheries.

The above described process results in formation of a uniform yellow coloration in the treated surface of the glass. A red coloration may be produced by using copper in lieu of silver and subsequently heating the stained article in a reducing atmosphere. Due to the relatively high temperature employed in staining, the surface cords are also uniformly colored. The relatively low copper and silver content of the staining composition and the use of a thin coating thereof not only makes for economy but is a definite aid in the production of uniform coloration and in the ease of removal of residual staining compound.

If desired, the stained members prior to sealing may be heated in a kiln to a temperature slightly in excess of that to which they will be subjected during sealing. This ensures that having once been heated throughout to this temperature any subsequent heat treatment of any part thereof at this temperature cannot cause any color change.

I claim:

1. In the method of making a glass electric lamp by staining a lens element and thermally sealing its periphery with the periphery of a glass reflector element, the step which comprises staining the lens element at a temperature about 100° C. higher than the temperature which it attains adjacent but not at its periphery during sealing.

2. The method of making a glass electric lamp, which comprises coating a heat-resisting glass lens element with a paste containing ochre, copper sulfide and an alkaline earth carbonate, firing the lens element at about 700° C., cooling it, removing the residue from the glass and thermally sealing the lens element at its periphery with a glass reflector element.

HENRY H. BLAU.